UNITED STATES PATENT OFFICE.

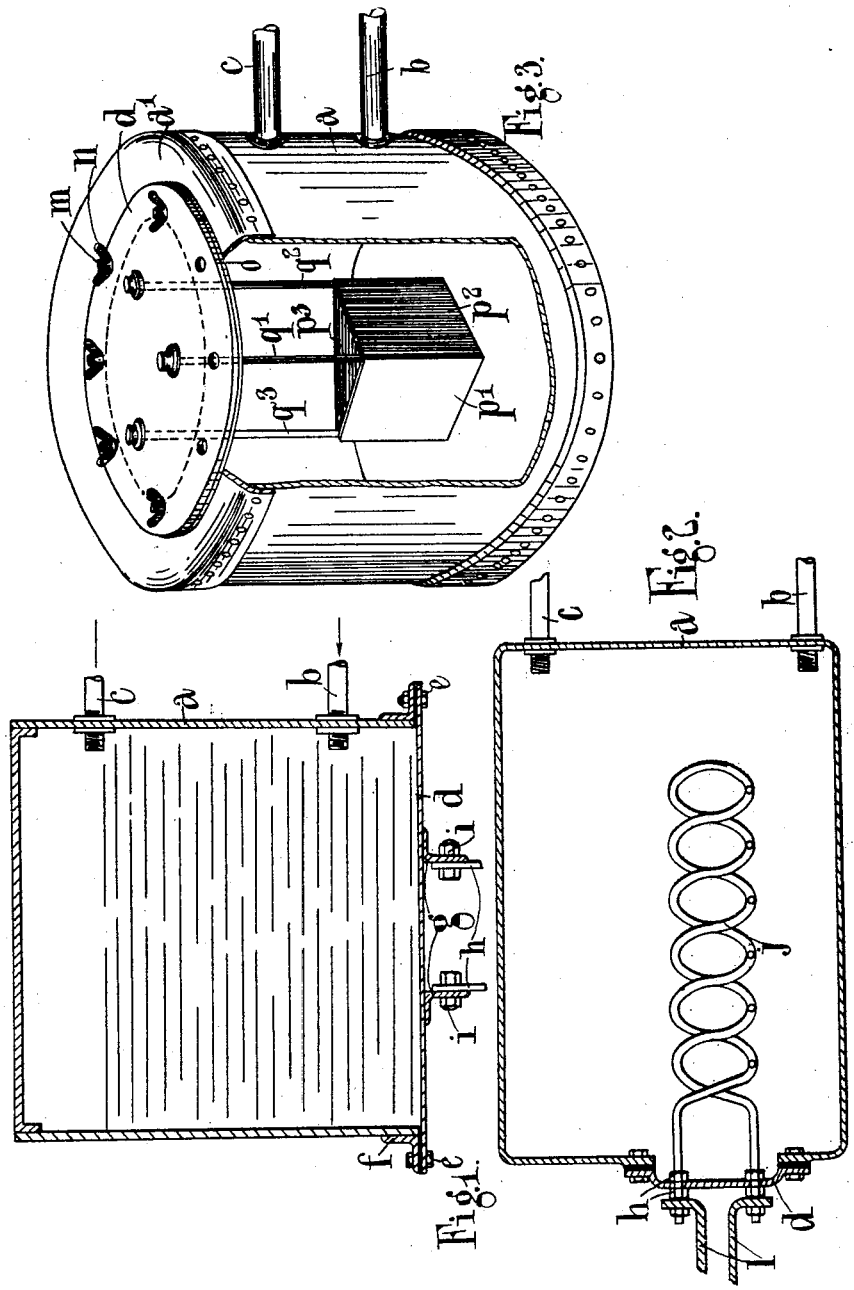

CLARENCE HAROLD LAUTH, OF LONDON, ENGLAND.

ELECTRICALLY-HEATED LIQUID-HEATER.

1,398,903.   Specification of Letters Patent.   Patented Nov. 29, 1921.

Application filed June 16, 1920. Serial No. 389,470.

*To all whom it may concern:*

Be it known that I, CLARENCE HAROLD LAUTH, A. M. I. E. E., B. Sc., a subject of the King of Great Britain and Ireland, residing at 11 Highbury Mansions, Upper street, Islington, London, N. 1, in the county of London, England, have invented certain new and useful Improvements in Connection with Electrically-Heated Liquid-Heaters, of which the following is a specification.

This invention relates to liquid heaters of the kind in which the heating is effected by means of an electric current of high amperage and low voltage, such as may be induced in the secondary circuit of a transformer and wherein the heating resistance is constituted by the shell of the vessel intended to receive the liquid to be heated.

It is known in electric liquid heaters of the kind in which the heating element is immersed in the liquid to be heated, to attach the said element to a removable portion of the vessel containing the liquid to be heated, and it is also known detachably to secure a heating plate to the bottom of a sad iron.

It has also been proposed in connection with hot plates, forming part of the secondary circuit of a transformer, to cause the current to pass only through a portion of the plate by cutting slits therein, and to make the said conducting portion of the plate of reduced section so as to produce a high temperature therein.

The present invention consists in a liquid heater of the kind first referred to in which the part of the shell which constitutes the heating resistance, through which the electric current is passed, is made separate and detachable from the remainder of the shell of the vessel, mainly with the object of allowing of its being readily removed, cleaned, repaired and renewed, and of permitting of easy access to the interior of the vessel.

The invention also consists in the improved electrically heated liquid heater hereinafter more particularly described.

Figures 1, 2, 3 in the accompanying drawings illustrate, by way of example, three different modes of carrying the invention into effect.

Referring to the form of construction illustrated in Fig. 1, $a$ is a water boiler or other heating vessel, which is provided with an inlet $b$ and outlet $c$. The bottom $d$ of the vessel is made separate and detachable from the remainder of the shell of the vessel, being insulated or not therefrom and secured thereto, for instance through the intermediary of bolts and nuts $e$ engaging with the bottom $d$ and a flange $f$ of L section welded or otherwise attached to the wall of the vessel. $g$ are metal lugs welded on to the bottom $d$ of the vessel and adapted to engage with the terminals $h$ of the secondary circuit of a transformer by means of bolts and nuts $i$, being preferably so positioned relatively to the bottom $d$, that a great part of the current shall pass between them. With the latter object in view the total electrical resistance of the portion of the bottom $d$ lying between the lugs should be much lower than the total resistance of all the other paths which the current can take through the remaining portion of the shell of the vessel.

The bottom $d$ may be constructed of thinner material or of higher specific resistance material than the remainder of the shell in order to make its electrical resistance greater than that of the remainder of the shell of the vessel, or such greater resistance of the bottom of the vessel may be obtained in any other manner.

Referring to the form of construction illustrated in Fig. 2, $a$ is a boiler or other vessel, $b$ and $c$ the liquid inlet and outlet respectively, and $d$ a cover which is secured to the vessel $a$ in a readily detachable way, for instance by means of bolts and nuts $d^1$, and to which is secured, also in a readily detachable way a heating element $j$. The latter penetrates into the vessel and preferably consists of a double spiral element, the ends of which pass through the cover $d$, and are connected to the terminals $l$ of the transformer, being also in electric contact with the cover $d$. Instead of one heating element $j$, several heating elements may be attached to one or more detachable covers, the shape and size of such elements being such that upon the said cover or covers being detached, the element or elements can be readily withdrawn from the interior of the vessel together with the covers.

The heating elements may be made of metal plate strips or coils or grids of wire of stout section capable of carrying the large heating current flowing in the secondary circuit of the transformer, and they may be arranged within the vessel in such a manner as to promote circulation of the water or liquid admitted into the vessel. This may, for instance, be effected by placing the heating elements near the central portion of the bottom of a circular boiler so as to cause an upward current of hot water in the middle and a downward current of cooler water near the sides of the boiler.

The detachable cover $d$ may be made of relatively badly conducting material.

In the case of two or three phase current, the current may be led to the detachable part of the shell by means of three or more terminals, and Fig. 3 illustrates, by way of example, such an arrangement. The top $a^1$ of the liquid heater $a$ is provided with a hole which is covered by a detachable lid $d$ adapted to be secured to the top $a^1$ by means of screws $m$ attached to the top and fly nuts $n$ engaging therewith, a washer $o$ of insulating material being inserted between the lid $d$ and top $a^1$. The heating element consists of three vertical metal plates $p^1$, $p^2$, $p^3$ arranged edge to edge, as shown, and attached at their abutting edges to three terminals $q^1$, $q^2$, $q^3$ which are secured to the lid $d$.

Instead of inserting the heating element through the top of the liquid heater, it may be inserted through the bottom thereof. In either case by unbolting the cover $d$ the heating element may be withdrawn from the vessel by removing it together with the lid to which it is attached by means of its terminals.

The details for carrying the invention into effect may be modified without in any way departing from the spirit and scope of the invention.

What I claim is:

1. A liquid heater to be heated by an electric current of high amperage and low voltage flowing through the shell of the heater having a portion of the shell constituting the heating resistance through which the electric current is passed, made separate and detachable from the remainder of the shell of the vessel intended to receive the liquid to be heated, as and for the purposes set forth.

2. A liquid heater to be heated by an electric current of high amperage and low voltage flowing through the shell of the heater having a detachable bottom plate which constitutes the heating resistance through which the electric current is passed, as set forth.

3. A liquid heater as claimed in claim 1, having lugs provided on the detachable portion of the shell constituting the heating resistance through which the electric current is passed, which lugs are preferably so positioned that the total electrical resistance of the portion of the bottom lying between the lugs will be much lower than the total resistance of all the paths which the current can take through the remaining portion of the shell of the vessel, as set forth.

4. A liquid heater as claimed in claim 1, having the detachable portion of the shell constituting the heating resistance constructed of higher specific resistance material than the remainder of the shell, for the purpose set forth.

5. A liquid heater as claimed in claim 1, having in electric contact with the detachable portion of the shell which constitutes the heating resistance an electric heating element immersed in the liquid to be heated, as set forth.

In testimony whereof I have signed my name to this specification.

CLARENCE HAROLD LAUTH.